(12) United States Patent
Walter

(10) Patent No.: US 8,602,082 B2
(45) Date of Patent: Dec. 10, 2013

(54) ROLLER BLIND SYSTEM FOR A MOTOR VEHICLE

(75) Inventor: Herbert Walter, Ebersbach (DE)

(73) Assignee: BOS GmbH & Co., KG, Ostfildern (DE)

( * ) Notice: Subject to any disclaimer, the term of this patent is extended or adjusted under 35 U.S.C. 154(b) by 0 days.

(21) Appl. No.: 13/326,452

(22) Filed: Dec. 15, 2011

(65) Prior Publication Data

US 2012/0152472 A1    Jun. 21, 2012

(30) Foreign Application Priority Data

Dec. 17, 2010 (DE) .......................... 10 2010 063 450

(51) Int. Cl.
*B60J 1/18* (2006.01)
(52) U.S. Cl.
USPC ...................... 160/370.22; 160/262; 160/242
(58) Field of Classification Search
USPC ............ 160/370.22, 262, 242; 296/97.8, 142, 296/143
See application file for complete search history.

(56) References Cited

U.S. PATENT DOCUMENTS

| | | | | |
|---|---|---|---|---|
| 3,075,805 | A * | 1/1963 | Golde et al. | 296/98 |
| 3,092,174 | A * | 6/1963 | Winn | 160/262 |
| 3,882,921 | A * | 5/1975 | Sandall | 160/266 |
| 4,347,886 | A * | 9/1982 | von Knorring | 160/242 |
| 5,201,810 | A * | 4/1993 | Ojima et al. | 160/265 |
| 6,776,211 | B2 * | 8/2004 | Schlecht et al. | 160/370.22 |
| 6,796,599 | B2 * | 9/2004 | Schlecht et al. | 296/143 |
| 7,089,992 | B2 * | 8/2006 | Walter et al. | 160/370.22 |
| 7,252,321 | B2 * | 8/2007 | Lee | 296/97.4 |
| 7,396,067 | B2 | 7/2008 | Thumm et al. | |
| 2002/0033244 | A1 * | 3/2002 | Schlecht et al. | 160/370.22 |
| 2004/0012225 | A1 | 1/2004 | Schlecht et al. | |
| 2005/0051285 | A1 * | 3/2005 | Yano et al. | 160/370.22 |
| 2006/0021721 | A1 * | 2/2006 | Walter et al. | 160/315 |
| 2007/0095489 | A1 | 5/2007 | Thumm et al. | |
| 2007/0137803 | A1 * | 6/2007 | Hansen et al. | 160/370.22 |
| 2008/0216970 | A1 * | 9/2008 | Lin | 160/262 |
| 2008/0289775 | A1 * | 11/2008 | Lukos | 160/242 |
| 2010/0116443 | A1 * | 5/2010 | Berman et al. | 160/242 |

FOREIGN PATENT DOCUMENTS

| | | |
|---|---|---|
| DE | 100 63 056 A1 | 7/2001 |
| DE | 101 40 239 A1 | 3/2003 |
| DE | 102 28 028 B3 | 2/2004 |
| DE | 10 2006 000 878 A1 | 3/2007 |

(Continued)

OTHER PUBLICATIONS

Office Action issued in German Patent Application No. 10 2010 063 450.6 dated Jul. 20, 2011 (10 pages).

(Continued)

*Primary Examiner* — David Purol
(74) *Attorney, Agent, or Firm* — Flynn, Thiel, Boutell & Tanis, P.C.

(57) ABSTRACT

A roller blind system for a motor vehicle for screening a vehicle window including a flexible sheet element, a roller blind shaft on which the flexible sheet element is wound in a stored state of the roller blind system and from which the flexible sheet element can be unwound in order to achieve a functional state of the roller blind system, a pull-out rod attached to an end of the sheet element oriented away from the roller blind shaft and two guide rails for guiding the pull-out rod on each side between a first position associated with the stored state and a second position associated with the functional state.

18 Claims, 3 Drawing Sheets

(56) References Cited

FOREIGN PATENT DOCUMENTS

| DE | 10 2005 052 618 A1 | 5/2007 |
| DE | 10 2007 058 262 A1 | 5/2009 |
| EP | 0 834 414 A2 | 4/1998 |
| EP | 1 375 219 A2 | 1/2004 |
| WO | WO 03/024729 A1 | 3/2003 |

OTHER PUBLICATIONS

European Patent Office Search Report dated Mar. 23, 2012 with English translation of categories of cited documents (8 pages).

* cited by examiner

ROLLER BLIND SYSTEM FOR A MOTOR VEHICLE

CROSS REFERENCE TO RELATED APPLICATIONS

This application claims priority from German Patent Application No. 10 2010 063 450.6, the entire disclosure of which is hereby incorporated by reference into this application.

FIELD OF USE AND PRIOR ART

The invention relates to a roller blind system for a motor vehicle, in particular for screening a vehicle window. The invention further relates to a motor vehicle, in particular a passenger car, having such a roller blind system.

A generic roller blind system comprises, as essential components, a flexible sheet element, a roller blind shaft on which the flexible sheet element is wound in a stored state of the roller blind system and from which the flexible sheet element can be unwound to achieve a functional state of the roller blind system, a pull-out rod attached to an end of the sheet element oriented away from the roller blind shaft and two guide rails for guiding the pull-out rod on each side between a first position associated with the stored state and a second position associated with the functional state.

Generic roller blind systems are commonly used in motor vehicles, especially of the executive class. As luggage compartment covers they serve to protect the luggage from curious glances. As shading roller blind systems they serve to protect the occupants of the motor vehicle from incident sunlight. A flexible sheet element of a generic roller blind system is wound on the roller blind shaft, which in most cases is tensioned by means of a spiral spring, until it is at least partially unwound from the roller blind shaft by a traction force on the pull-out rod. In the generic type of roller blind system, the pull-out rod is guided on both sides in guides which may be disposed, for example, along the C-pillar of a vehicle and which predetermine a defined path between the first and second positions of the pull-out rod. In most cases, generic roller blind systems are controllable by means of an electric motor. However, this is not necessarily the case.

Known generic roller blind systems are particularly well suited to screening substantially flat window surfaces, since they make available in the functional state a substantially flat sheet element because of the usually straight pull-out rods, the usually straight roller blind shafts and the straight orientation of the sheet element, brought about by the spiral spring, between roller blind shaft and pull-out rod.

In recent years, however, the surface shaping of motor vehicles has deviated increasingly from such flat orientations, so that shading by means of sheet elements which are flat in the functional state is no longer regarded as ideal. It is therefore already known from the prior art to use pull-out rods which are curved along their length instead of the straight pull-out rods. It is also known to use roller blind shafts which are curved and which are maintained in this curved position by a curved spindle provided in a fixed manner on the vehicle. Thus, especially in the case of shading systems for the roof area, it is already known to provide a roller blind the sheet element of which is convex in a manner corresponding to the shape of the vehicle roof.

However, it has been found that, especially with regard to shading the rear window of a vehicle, the existing systems are not yet ideal. Thus, a curved pull-out rod for a rear window roller blind must preferably be oriented approximately horizontally in the stored state, since it should not project in an unattractive manner over the parcel shelf of a vehicle in the stored state. However, in the case of a rear window roller blind this horizontal position of the curved pull-rod does not represent an ideal orientation in the second position of the pull-out rod, since sunlight can enter the vehicle unhindered in an approximately central region above the horizontally disposed pull-out rod because of the convexity of the vehicle roof and of the rear window.

OBJECT AND SOLUTION

It is therefore the object of the invention to make available an improved roller blind system which is advantageous in comparison to the known roller blind systems with regard to the screening of convex surfaces, in particular convex vehicle windows.

This is achieved according to the invention in that the pull-out rod has a curved configuration and in that it is provided that the pull-out rod is swivelled about a pull-out rod axis when being transferred from its first position along the guide rails to its second position.

Accordingly, it is provided according to the invention that the curved pull-out rod is aligned at a different swivel angle in its first position than in its second position. In particular, in its first position the pull-out rod can adopt a position in which it extends parallel to a horizontal plane, while in its second position it is swivelled with respect to that plane so that a central part of the pull-out rod is raised with respect to the ends arranged in the guide rails on both sides. It is thereby achieved that light cannot reach the interior of the vehicle unimpeded through the window, in particular the rear window, even in this central region. Within the meaning of the invention, curvature is understood to mean a disposition of the pull-out rod in which a central attachment point of the sheet element to the pull-out rod, in relation to the longitudinal direction, is spaced by at least 5 mm, preferably by at least 10 mm, from an imaginary connecting line extending between the attachment points of the sheet element to the pull-out rod located at the outer sides of the sheet element.

In principle, it is possible for the swivelling of the pull-out rod to be effected by a separate motor provided for this purpose. Preferably, however, the swivelling motion is effected by a mechanical coupling to the position of the pull-out rod along the guide rails, especially preferably by a direct interaction between the guide rails and the pull-out rod. To this end it is regarded as an advantageous solution if the pull-out rod is guided by the guide rails in such a manner that it is oriented according to the orientation of the guide rails, the guide rails being curved at least zonally, so that the mechanically induced swivelling movement of the pull-out rod takes place in the region of this curvature.

An especially good shading effect is produced if the roller blind shaft also has a curved configuration, a mean curvature of the roller blind shaft preferably corresponding approximately (+/−20%) to a mean curvature of the pull-out rod. A curved roller blind shaft may be obtained, for example, in that, as a result of the material selection, the roller blind shaft is intrinsically flexible, or in that it consists of individual segments which can be at least slightly angled with respect to one another. In both cases there must be provided a support, for example in the form of a curved spindle, which maintains the defined curvature of the roller blind shaft. Through the curvature of the roller blind shaft in addition, it is achieved that the sheet element is maintained in a convex disposition at both ends and therefore exhibits a desirable convexity in its totality.

It is especially advantageous if the roller blind shaft is mounted rotatably on a roller blind shaft support, which roller blind shaft support is configured to be swivellable about a roller blind shaft support axis.

With this configuration, therefore, the roller blind shaft is not only curved in itself, but can also be swivelled, in a similar manner to the pull-out rod, about a roller blind shaft support axis which is aligned parallel to the pull-out rod axis. This makes it possible to bring about a better approximation or conformity of the sheet element in the functional state to the window to be shaded, in particular the rear window, since the swivellability of the roller blind shaft enables this shaft also to approximate or conform more closely to the usually lower end of the glass. A particular advantage, in conjunction with the swivelling mobility of the roller blind shaft support, is that the uneven pull on the sheet element caused by the swivelling movement of the curved pull-out rod is thereby compensated for. When the pull-out rod is swivelled to the second position in the course of its movement, a middle part of the sheet element is moved in phases more quickly than the two laterally adjoining edge regions. Through the swivellability of the roller blind shaft support and therefore of the curved roller blind shaft, the shaft can follow this movement of the pull-out rod at least approximately, thus preventing wrinkling.

In this regard, it is sufficient in the simplest case that this compensation is present only when the pull-out rod is arranged in its first and in its second position. It can thus be provided, for example, that when the pull-out rod is moved from the first position to the second position, swivelling of the roller blind shaft takes place immediately at the start of the movement, the roller blind shaft directly adopting a swivel angle which resembles the swivel angle of the pull-out rod in the second position. It is also possible to delay the swivelling movement of the roller blind shaft support until the end of the movement of the pull-out rod, so that, as the pull-out rod is transferred from the first position to the second position, the roller blind shaft support initially remains immobile and is swivelled by the pull-out rod only directly before reaching, or upon reaching, the second position.

However, it is advantageous if the pull-out rod and the roller blind shaft support are operatively coupled to one another in such a manner that a swivelling movement of the roller blind shaft support and a swivelling movement of the pull-out rod always take place with the same orientation, and preferably with substantially the same swivelling velocity. Accordingly, it is provided with such a configuration that the pull-out rod and the roller blind shaft support move approximately parallel to one another. As soon as the pull-out rod is swivelled, the roller blind shaft support also swivels. It is thereby ensured that troublesome wrinkling does not occur even during the transfer of the pull-out rod between the two positions. Within the meaning of this invention, a substantially equal swivelling velocity is understood to mean a swivelling velocity difference of not more than 20%.

It is advantageous if there is provided a return spring by which the roller blind shaft support is urged in the direction of a stop and against the force of which the roller blind shaft support can be swivellably deflected. With such a configuration, therefore, an opposing force acting against the return spring is required. This force is preferably provided by the displacement of the pull-out rod to the second position. As the pull-out rod is returned to the first position, this opposing force is no longer present, so that the return spring reliably urges the roller blind shaft support to a position defined by the stop.

A first possibility for generating this opposing force provides that a coil spring acting between the roller blind shaft support and the roller blind shaft is coordinated with the return spring in such a manner that the roller blind shaft support rests against the stop in the stored state of the roller blind system and is at a distance from the stop in the functional state of the roller blind system. In this case the coordination with the coil spring is such that in the first position the force of the return spring is greater than that of the coil spring, so that the roller blind shaft support is pressed against the stop. In the course of the transfer of the pull-out rod to its second position the coil spring, in the form, for example, of a helical spring, is tensioned, so that it exerts a force on the roller blind shaft support which is greater than that of the return spring. As a consequence, a swivelling movement of the roller blind shaft support away from the stop takes place.

However, a configuration is preferred in which an electric motor, by means of which the swivelling movement of the roller blind shaft support is controllable, is provided. This electric motor may be activated by a control system which is also responsible for the movement of the pull-out rod. It is especially advantageous if the electric motor by means of which the swivelling movement of the roller blind shaft support is controllable serves at the same time to control the movement of the pull-out rod between the first position and the second position. With such a configuration, therefore, only one motor, which effects both the movement of the pull-out rod in the guide rails and the movement of the roller blind shaft support, is used. An especially advantageous connection between the electric motor and the roller blind shaft support on the one hand, and the pull-out rod on the other, is achieved by a flexible push and/or pull element which is movable in its direction of extent by means of the electric motor. In the simplest case, such a push and/or pull element may be in the form of a cable which can be loaded only in tension. Greater reliability is achieved with a movable push element which is guided in tube-like channels. Such push elements for moving pull-out rods are generally known. However, the push elements may also be advantageously used for moving the roller blind shaft support. In this case it is especially advantageous constructionally if the pull-out rod and the roller blind shaft support are connected to the push and/or pull element on opposite sides of the motor. With such a configuration advantage can be taken of the fact that a working tube running to the guide rail and a storage tube running in the opposite direction are usually provided for flexible push elements, the storage tube being used in known configurations only to accommodate the push element when, in the stored state of the roller blind system, the preponderant part of the push element has been withdrawn from the guide rail. With the configuration according to the invention, this storage tube can be used to lead to a mechanism which is configured to move the roller blind shaft support.

It is especially advantageous if the electric motor is configured to effect translational or rotary movement of a control cam, especially via the aforementioned push and/or pull element, a control cam lever which engages with the control cam being provided on the roller blind shaft support. The control cam is moved translationally or rotationally by the electric motor, in particular by the translational movement of a push element. The control cam lever is deflected by this movement of the control cam, and very flexible control of the swivelling movement of the roller blind shaft support can be made possible by the shaping of the control cam. This enables the control cam to be configured in such a manner that a swivelling movement having substantially the same orientation and the same velocity is achieved both for the pull-out rod and for the roller blind shaft support.

The invention further relates to a motor vehicle having a roller blind system of the type described above. It is especially advantageous if this roller blind system is provided in the region of a rear window of the vehicle.

BRIEF DESCRIPTION OF THE DRAWINGS

Further advantages and aspects of the invention are apparent not only from the claims but also from the following description of a preferred exemplary embodiment of the invention which is elucidated with reference to the figures, in which:

FIGS. 1 and 1a show a roller blind system according to the invention in a stored state and a mechanism for activating a roller blind shaft support in this state, FIGS. 2 and 2a show the roller blind system and the mechanism of FIGS. 1 and 1a in an intermediate state.

DETAILED DESCRIPTION OF THE EXEMPLARY EMBODIMENT

Figure 1:
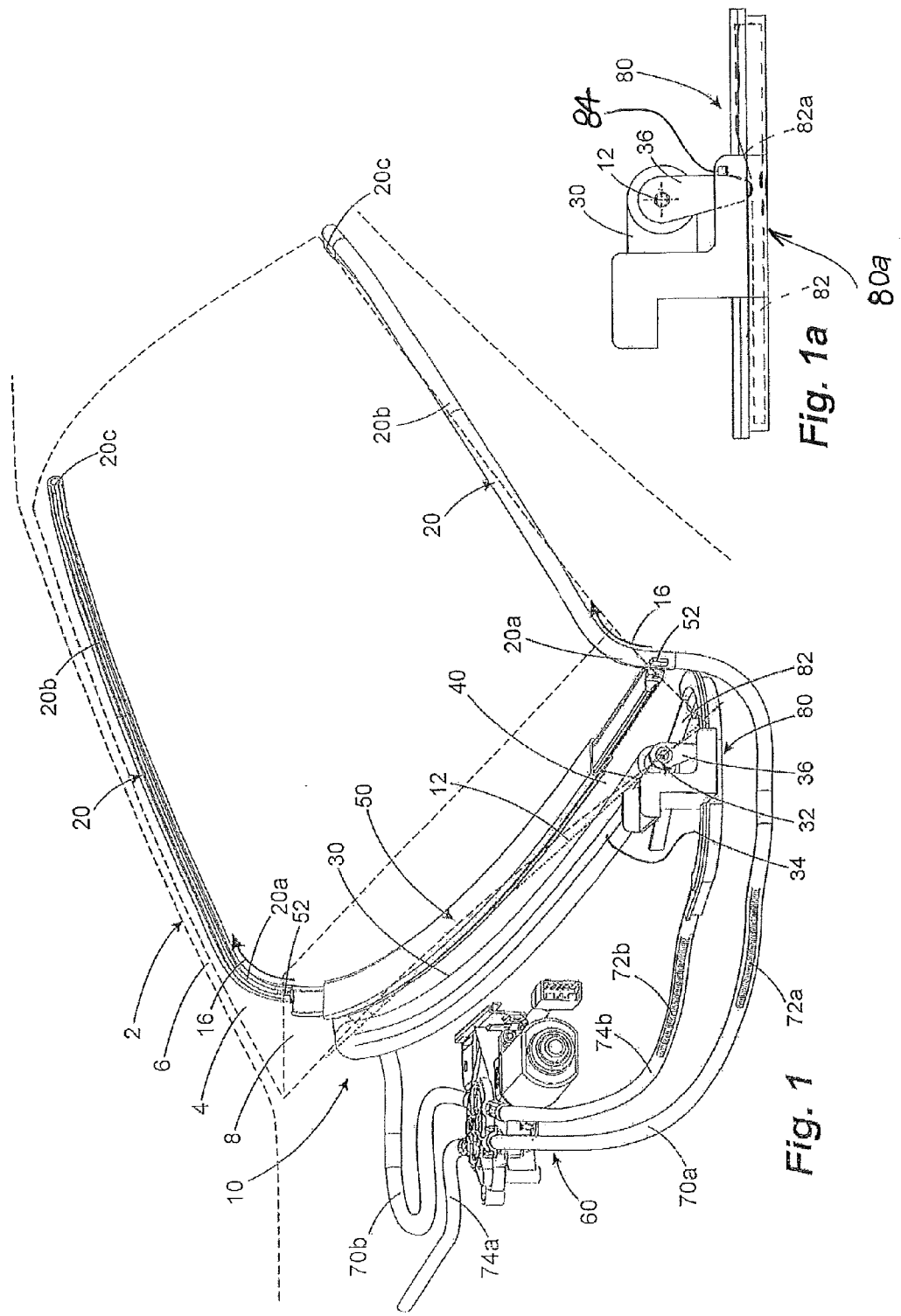

FIG. 1 shows a roller blind system 10 according to the invention which is provided in the region of a rear window 4 of a vehicle 2. This roller blind system 10 includes the following main components: two guide rails 20, which are open on the side facing towards one another and have a substantially curved region 20a which is adjoined by a substantially rectilinear region 20b, are provided in the region of the C-pillars 6 of the vehicle. A curved roller blind shaft 30, which is held in its curved disposition by an inherently rigid roller blind shaft spindle 34, is provided in the region of a parcel shelf 8 of the vehicle. The roller blind shaft 30 may include individual segments which can be angled with respect to one another and are connected non-rotatably to one another, or of an inherently flexible roller blind shaft body. The curved roller blind shaft spindle 34 forms part of a roller blind shaft support 32 which can be swivelled about a roller blind shaft support axis 12 by means of a mounting (not shown in detail). A sheet element 40, the free end of which is fastened to a pull-out rod 50, is wound on to the roller blind shaft 30. The pull-out rod 50 has a curved configuration corresponding to the roller blind shaft 30 and is provided at each of its ends with engagement sections 52 which engage in the two guide rails 20. Since the distance between the guide rails 20 diminishes towards the distal end 20c, the pull-out rod 50 is configured as a telescopic pull-out rod of variable length.

An electric motor 60 is provided to move the pull-out rod 50 in the guide rails 20. Tube-like channels 70a, 70b run from the electric motor 60 to the rear ends of the guide rails 20, and flexible core elements 72a, 72b (only indicated partially in the figures) suitable for transmitting thrust forces are arranged inside the channels 70a, 70b. By energising the electric motor 60 the two core elements 72a, 72b can be moved in opposite directions, so that they jointly displace the pull-out rod 50 from its first position shown in FIG. 1. In addition, two storage tubes 74a, 74b, into which the core elements 72a, 72b are retracted when they are withdrawn from the guide rails 20 by means of the motor, are provided on the motor 60. Whereas the storage tube 74a performs no function apart from storage, the storage tube 74b runs to a control cam mechanism 80. This is represented in detail in FIG. 1a. The control cam mechanism 80 includes a channel 80a within which a control cam element 82 can be moved translationally. In addition, a cam lever 36, connected non-rotatably to the spindle 34 of the roller blind shaft support 32, projects into this channel, so that an interaction, to be elucidated in the following text, between the control cam element 82 and the cam lever 36 is achieved. As long as such an interaction is not yet effective, the cam lever 36, and with it the whole roller blind shaft support 32, is pressed against a stop 84 by a return spring (not shown), and therefore adopts a defined position.

FIG. 1 shows a stored state of the roller blind system 10. In this stored state both the curved roller blind shaft 30 and the curved pull-out rod 50 are in an approximately horizontal position. This allows the pull-out rod 50 to be lowered to an almost invisible position in the region of the parcel shelf 8.

In order to transfer the roller blind system to a functional state, the core elements 72a, 72b are moved into the guide rails 20 by the motor 60. The core elements 72a 72b act on the engagement sections 52 of the pull-out rod 50, which are displaced as this happens in the direction of the arrows 16 shown in FIG. 1. Because of the physical coupling, brought about by the guide sections 52, between the direction of extent of the guide rails 20 and the orientation of the pull-out profile or rod 50, the pull-out rod 50 is swivelled in a manner about a pull-out rod axis 14 which can be seen in FIG. 2. In the intermediate position of FIG. 2, the pull-out rod 50 is swivelled from its previously approximately horizontal position of FIG. 1 in the direction of a vertical position of FIG. 2.

Figure 2:
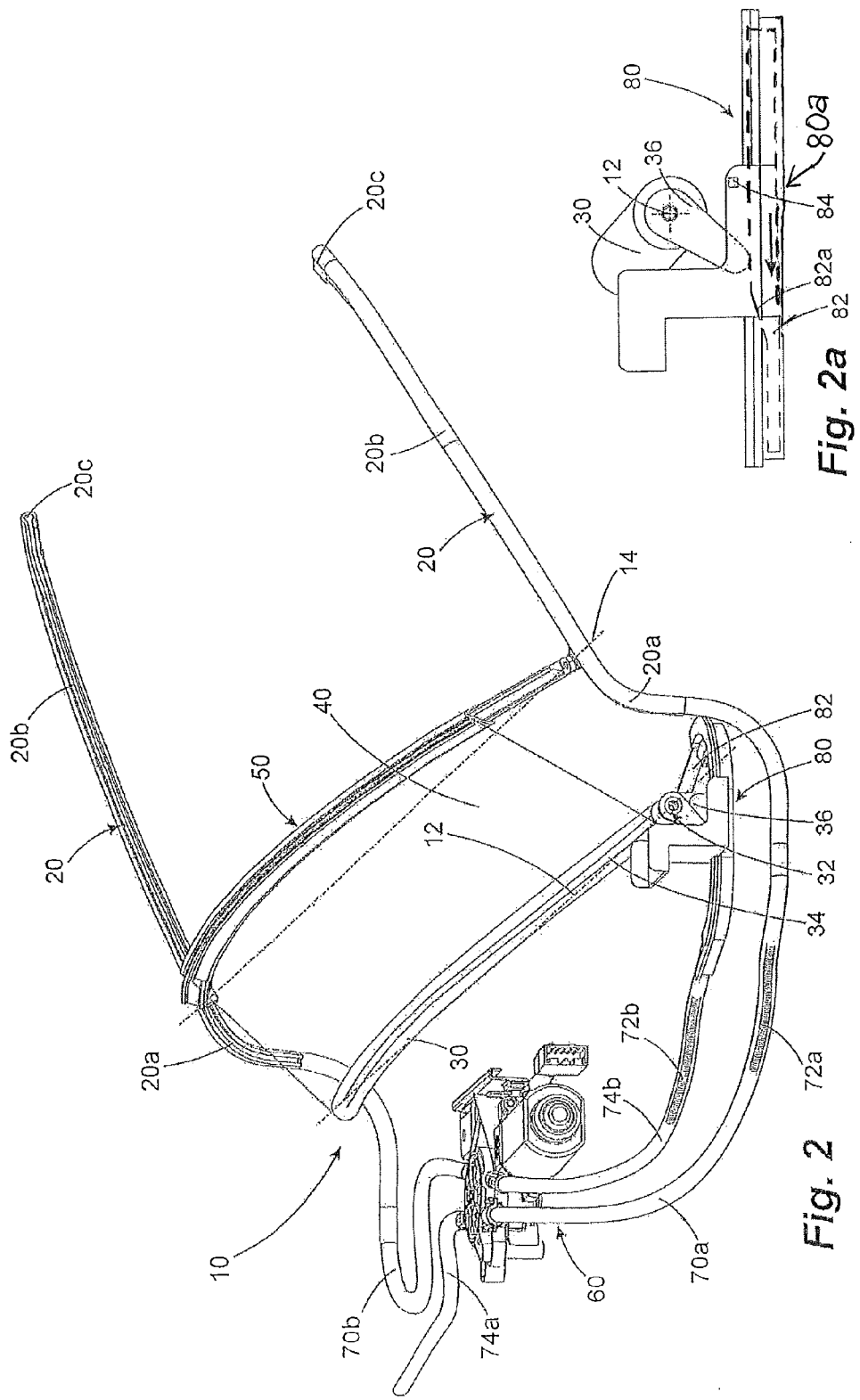
Figure 3:
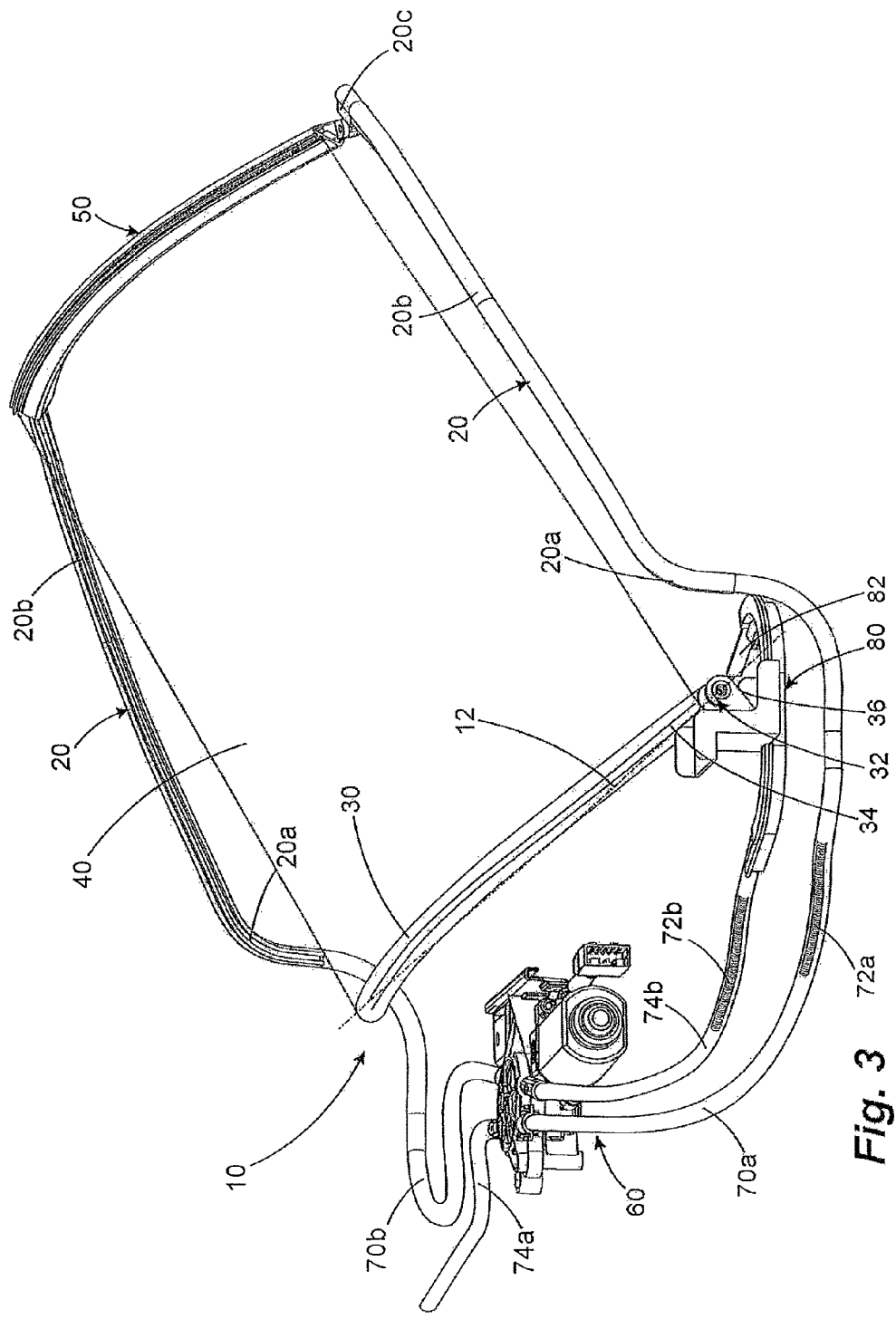
FIG. 3 shows the roller blind system of FIGS. 1 and 2 in a functional state.

At the same time, as can be seen in FIG. 2a, the cam lever 36 is swivelled by the control cam element 82, which is likewise moved by the movement of the core element 72b. A gradient 82a in the control cam element 82 causes the cam lever 36 to move away from the stop 84 against the force of the return spring (not shown) and to be swivelled, together with the roller blind shaft support 32 in its entirety, about the corresponding pivot axis 12. As can be seen in FIG. 2, this causes the curved roller blind shaft 30 also to be swivelled approximately simultaneously and by approximately the same amount as the pull-out rod 50. As a result, on the one hand the roller blind shaft 30 approaches the rear window 4 of the vehicle 2 while, on the other, it is ensured that wrinkling does not occur in the edge regions of the sheet element 40 as a result of the increased velocity of the middle region thereof as compared to the edge regions. The continuation of the movement of the pull-out rod 50 along the guide rails 20, starting from the intermediate state of FIG. 2, does not produce any significant further swivelling movement of the pull-out rod 50 or of the roller blind shaft 30. These remain to a large extent in the swivelled position of FIG. 2, until the functional state of FIG. 3 is reached. In this functional state a practically ideally convex shading of the rear window 4 is achieved, in which the middle upper region of the rear window 4, in particular, is also well screened because of the swivelled position of the pull-out rod 50.

The transfer of the roller blind system 10 back to its stored state takes place with the respective opposite sequence of movements. As soon as the pull-out rod 50 has again reached the curved region 20b of the guide rails 20, it reverts to its approximately horizontal orientation of FIG. 1. At the same time, the displacement of the control cam element 82 in conjunction with the return spring (not shown) again causes the roller blind shaft 30 to be swivelled back to its starting position shown in FIG. 1, so that the state of FIG. 1 is again reached towards the end of the return transfer process.

The invention claimed is:

1. A roller blind system for screening a motor vehicle window, said roller blind system comprising:
a flexible sheet element;
a roller blind shaft on which the flexible sheet element is wound in a stored state of the roller blind system and from which the flexible sheet element is at least partially unwound in a functional state of the roller blind system;

a roller blind shaft support on which the roller blind shaft is mounted for rotation;

two guide rails; and a pull-out rod attached to an end of the flexible sheet element oriented away from the roller blind shaft, the pull-out rod having a pair of spaced-apart ends through which a pull-out rod axis is defined and a central region disposed between the ends, the pull-out rod having an outwardly convex configuration such that the central region is offset from the pull-out rod axis and the ends, the ends of the pull-out rod being engaged with the respective guide rails such that the guide rails guide the pull-out rod between a first position in which the flexible sheet element is in the stored state and a second position in which the flexible sheet element is in the functional state, the pull-out rod being supported on the guide rails for swiveling movement about the pull-out rod axis as the pull-out rod is transferred along the guide rails from the first position to the second position in which second position the central region is disposed substantially vertically above the ends of the pull-out rod;

the roller blind shaft having a pair of ends through which a roller blind shaft axis is defined and a central region disposed between the ends of the roller blind shaft, the roller blind shaft having an outwardly convex configuration such that the central region of the roller blind shaft is offset from the roller blind shaft axis and the ends of the roller blind shaft, the outwardly convex configuration of the roller blind shaft substantially corresponding to the outwardly convex configuration of the pull-out rod, the roller blind shaft being supported on the roller blind shaft support for swiveling about the roller blind shaft axis during transfer of the pull-out rod from the first position to the second position, the central region of the roller blind shaft in the second position being disposed substantially vertically above the ends of the roller blind shaft.

2. The roller blind system of claim 1, further including a mechanism operatively connecting the pull-out rod and the roller blind shaft to one another for swiveling movement about their respective axes at substantially the same velocity during transfer of the pull-out rod from the first position to the second position.

3. The roller blind system of claim 1, further including a mechanism operatively connecting the pull-out rod and the roller blind shaft to one another for substantially simultaneous movement about their respective axes during transfer of the pull-out rod from the first position to the second position.

4. The roller blind system of claim 3, wherein the mechanism includes a cam arrangement having a cam lever connected to the roller blind shaft and a control cam engaged with the cam lever such that movement of the control cam causes rotational movement of the cam lever and the roller blind shaft.

5. The roller blind system of claim 4, further including an electric motor and a core element operatively connected to the electric motor and to the control cam, wherein actuation of the electric motor causes movement of the core element, the control cam and the cam lever for swiveling the roller blind shaft about the roller blind shaft axis during transfer of the pull-out rod from the first position to the second position.

6. The roller blind system of claim 5, wherein the core element is a first core element and the roller blind system includes a second core element operatively connected to the electric motor and first and second channels in which the first and second core elements are respectively disposed, wherein actuation of the electric motor causes movement of the first and second core elements into the respective guide rails and into engagement with the respective ends of the pull-out rod to move the pull-out rod from the first position to the second position.

7. The roller blind system of claim 6, wherein upon actuation of the electric motor the first core element moves within the first channel and is disposed to act on both the pull-out rod and the roller blind shaft.

8. The roller blind system of claim 7, wherein the pull-out rod and the roller blind shaft are connected to the first core element on opposite sides of the electric motor.

9. The roller blind system of claim 1, wherein each of the guide rails has a curved portion connected to a substantially linear portion, the substantially linear portions being oriented downstream, in a direction of transfer of the pull-out rod from the first position to the second position, from the respective curved portions, the respective ends of the pull-out rod being engaged within the respective curved portions of the guide rails during transfer from the first position to the second position, the curved portions being configured to cause the swiveling of the pull-out rod about the pull-out rod axis, the respective ends of the pull-out rod being engaged within the respective linear portions of the guide rails in the second position.

10. The roller blind system of claim 9, wherein the respective curved portions of the guide rails have an outwardly convex configuration and are joined to the respective linear portions of the guide rails at respective upper ends of the curved portions.

11. A roller blind system for screening a vehicle window, said system comprising:

a flexible sheet element;

a roller blind shaft, said flexible sheet element being wound on said roller blind shaft in a stored state of said roller blind system and at least partially unwound from said roller blind shaft in a functional state of said roller blind system;

a pull-out rod attached to an end of said sheet element spaced away from said roller blind shaft, said pull-out rod having a pair of laterally spaced-apart ends through which a pull-out rod axis is defined and a central region disposed between said ends, said pull-out rod having an outwardly convex curvature such that said central region is offset from said ends and the pull-out rod axis; and a pair of guide rails spaced laterally from one another on opposite sides of said pull-out rod, said ends of said pull-out rod being engaged within the respective said guide rails with said pull-out rod extending transversely between said guide rails, said guide rails being disposed to guide said pull-out rod between a first retracted position in which said sheet element is in the stored state and a second extended position in which said sheet element is in the functional state, said central region of said pull-out rod being substantially horizontally offset from said ends of said pull-out rod and the pull-out rod axis in the first retracted position, said guide rails each being configured such that said pull-out rod swivels about the pull-out rod axis as said pull-out rod is transferred from the first retracted position to the second extended position, said central region being substantially vertically upwardly offset from said ends and the pull-out rod axis in the second extended position;

said roller blind shaft having a pair of ends through which a roller blind shaft axis is defined and a central region disposed between said ends of said roller blind shaft, said roller blind shaft having an outwardly convex curvature such that said central region of said roller blind shaft is substantially horizontally offset from said ends of said roller blind shaft and the roller blind axis in the first retracted position of said pull-out rod, said curvature of said roller blind shaft substantially corresponding to said curvature of said pull-out rod, said roller blind shaft swiveling about the roller blind shaft axis during transfer of said pull-out rod from the first retracted position to the second extended position such that said central region of said roller blind shaft is substantially vertically upwardly offset from said ends of said roller blind shaft and the roller blind shaft axis in the second extended position of said pull-out rod.

12. The roller blind system of claim 11, wherein each of said guide rails has a curved portion connected to a substantially linear portion, said substantially linear portions being oriented downstream, in a direction of transfer of said pull-out rod from the first retracted position to the second extended position, from the respective said curved portions.

13. The roller blind system of claim 12, wherein each said end of said pull-out rod engages within the respective said curved portion during transfer of said pull-out rod from the first retracted position to the second extended position, said curved portions being oriented transversely relative to the respective said linear portions to cause the swiveling of said pull-out rod about the pull-out rod axis, each said end of said pull-out rod being engaged within the respective said linear portion of the respective said guide rail in the second extended position.

14. The roller blind system of claim 11, further including a mechanism operatively connecting said pull-out rod and said roller blind shaft to one another for substantially simultaneous swiveling movement about their respective axes during transfer of said pull-out rod from the first retracted position to the second extended position.

15. The roller blind system of claim 14, wherein said mechanism includes a cam arrangement having a cam lever connected to said roller blind shaft for rotation therewith and a control cam engaged with said cam lever such that movement of said control cam causes rotational movement of said cam lever and said roller blind shaft about the roller blind shaft axis.

16. The roller blind system of claim 15, further including an electric motor and a core element operatively connected to said motor and to said control cam, wherein actuation of said electric motor causes movement of said core element and said control cam for swiveling said roller blind shaft about the roller blind shaft axis during transfer of said pull-out rod from the first retracted position to the second extended position.

17. The roller blind system of claim 16, wherein said core element is a first core element and said roller blind system includes a second core element operatively connected to said electric motor and first and second channels in which said first and second core elements are respectively disposed, wherein actuation of said electric motor causes movement of said first and second core elements into the respective said guide rails and into engagement with the respective said ends of said pull-out rod to move said pull-out rod from the first retracted position to the second extended position.

18. The roller blind system of claim 17, wherein upon actuation of said electric motor said first core element moves within said first channel and is disposed to act on both said pull-out rod and said roller blind shaft.

* * * * *